United States Patent [19]

Titcomb

[11] Patent Number: 5,328,271
[45] Date of Patent: Jul. 12, 1994

[54] HYDRODYNAMIC SPINDLE BEARING FOR ULTRA-SLIM DISK STORAGE UNIT

[75] Inventor: Forrest D. Titcomb, Colorado Springs, Colo.

[73] Assignee: Maxtor Corporation, San Jose, Calif.

[21] Appl. No.: 881,739

[22] Filed: May 6, 1992

[51] Int. Cl.⁵ .................... F16C 32/06; G02B 26/10
[52] U.S. Cl. ..................... 384/108; 360/99.12; 384/610
[58] Field of Search .............. 384/100, 108, 109, 110, 384/121, 245, 610; 310/90, 67 R; 360/98.07, 98.08, 99.04, 99.05, 99.08, 99.12

[56] References Cited

U.S. PATENT DOCUMENTS

| | | | |
|---|---|---|---|
| 4,116,500 | 9/1978 | Hüber | 384/108 |
| 4,135,771 | 1/1979 | Hüber et al. | 384/108 |
| 4,526,484 | 7/1985 | Stahl et al. | 384/133 |
| 4,786,997 | 11/1988 | Funabashi et al. | 360/99.12 |
| 4,795,275 | 1/1989 | Titcomb et al. | 384/107 |
| 5,067,528 | 11/1991 | Titcomb et al. | 141/4 |
| 5,141,338 | 8/1992 | Asada et al. | 384/100 X |

FOREIGN PATENT DOCUMENTS

| | | | |
|---|---|---|---|
| 56268 | 4/1983 | Japan | 360/99.12 |
| 200221 | 10/1985 | Japan | 384/108 |
| 211118 | 10/1985 | Japan | 384/109 |
| 186118 | 7/1990 | Japan | 384/108 |

OTHER PUBLICATIONS

"On the Stability of Rotor-and-Bearing Systems And On The Calculation of Sliding Bearings," by J. P. Reinhoudt, Feb. 1972.

*Primary Examiner*—Thomas R. Hannon
*Attorney, Agent, or Firm*—Blakely, Sokoloff, Taylor & Zafman

[57] ABSTRACT

A hydrodynamic bearing assembly for a disk storage unit includes a hub having a longitudinal axis disposed in a cavity formed between a base and a cover. A pair of balls is disposed within a pair of corresponding sockets with each being aligned opposite one another along a longitudinal axis of the hub. The pair of sockets are affixed to the base and cover plates, respectively, while the pair of balls are affixed to the hub. The clearance space between each ball and socket is filled with a liquid lubricant held in place by a surface tension seal.

34 Claims, 4 Drawing Sheets

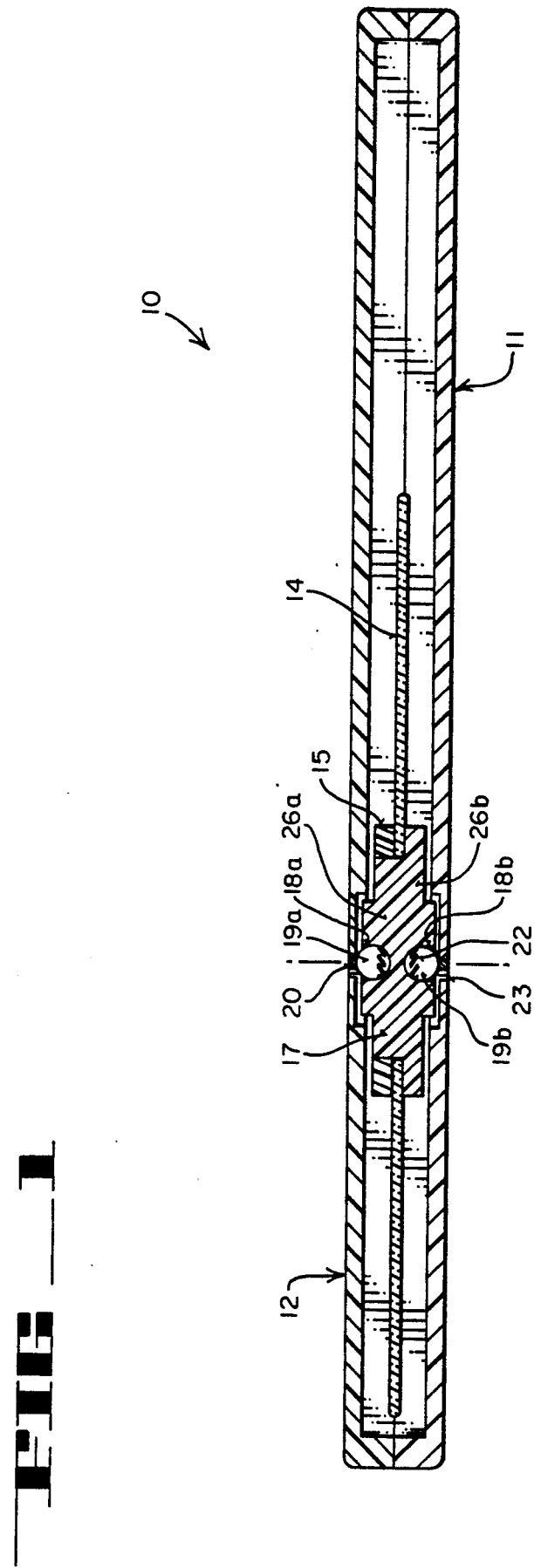
FIG—1

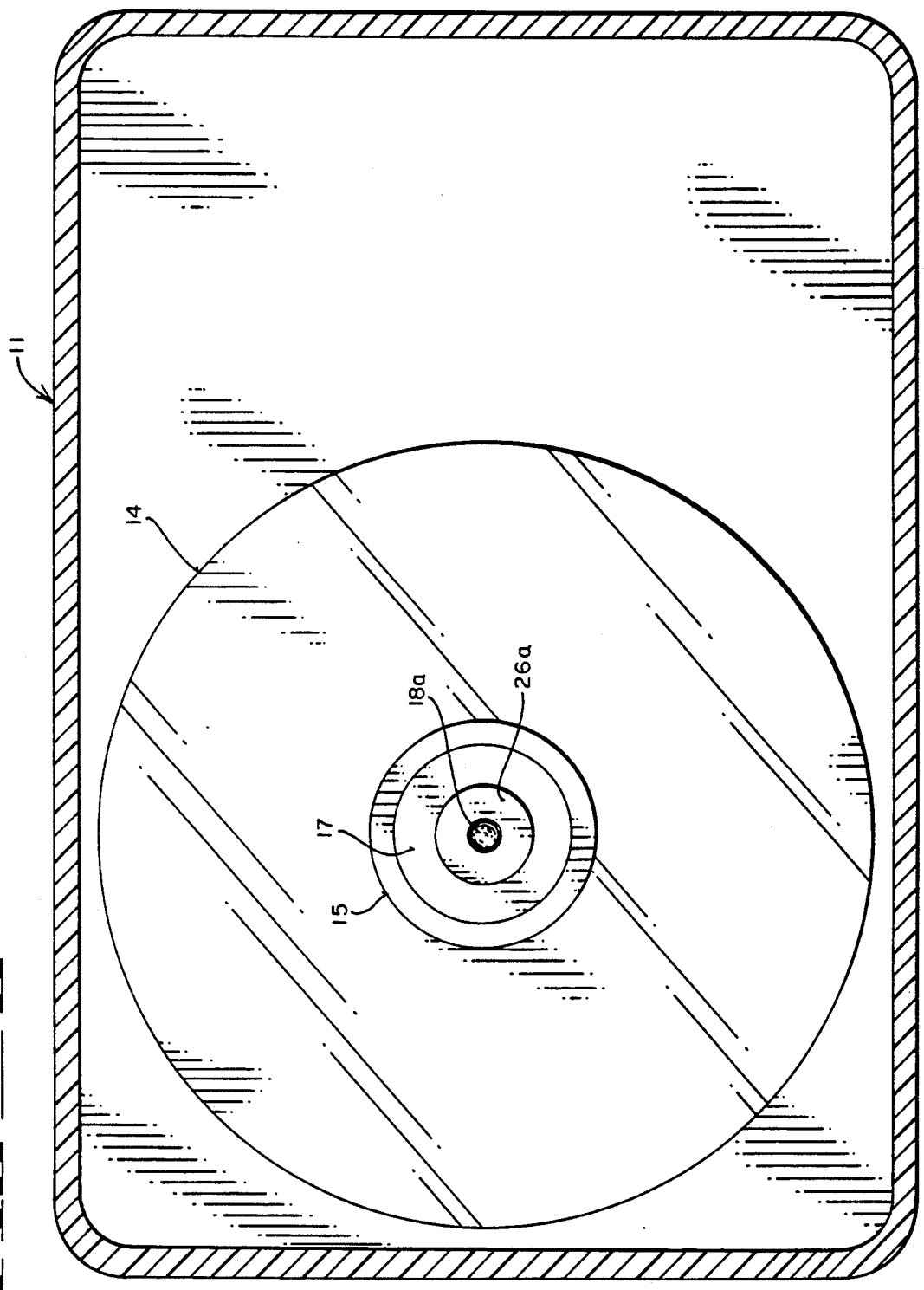

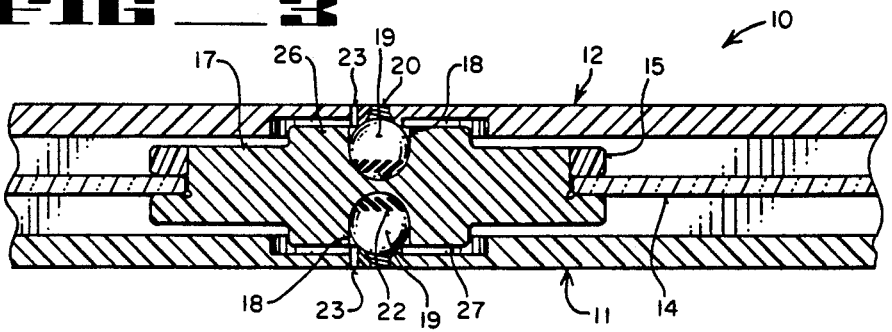
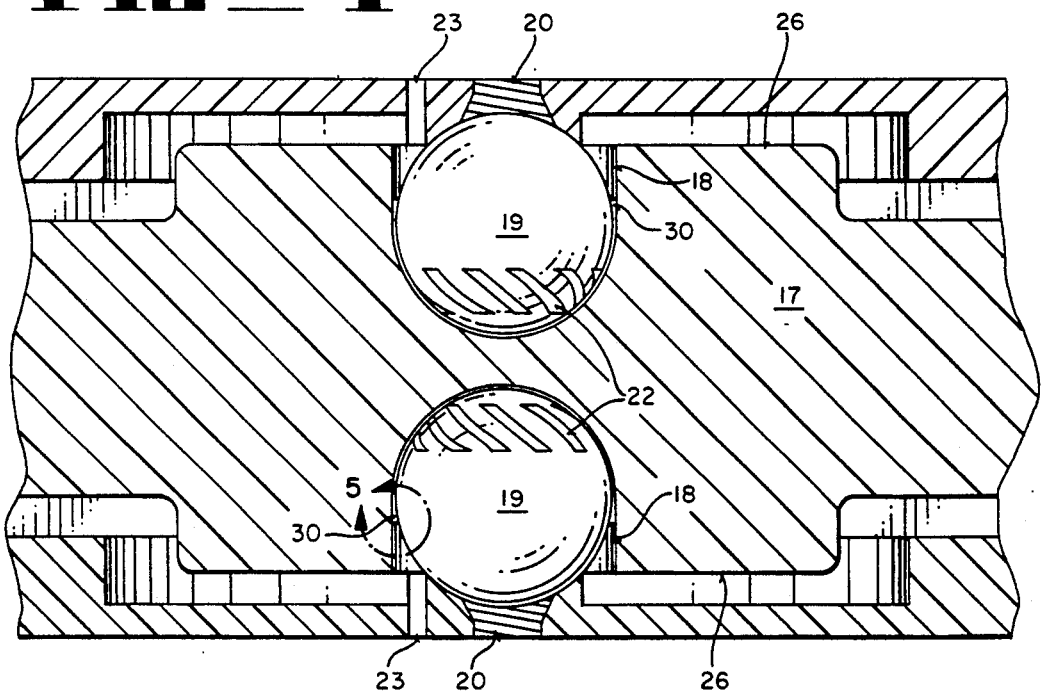
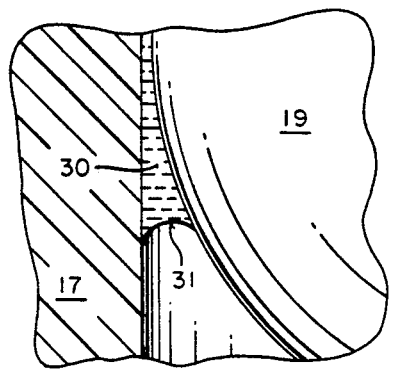

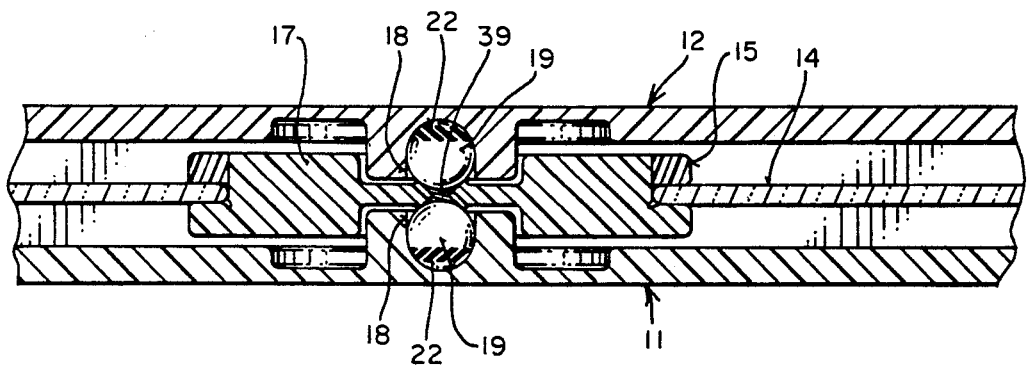
FIG _ 6

HYDRODYNAMIC SPINDLE BEARING FOR ULTRA-SLIM DISK STORAGE UNIT

FIELD OF THE INVENTION

This invention relates to the field of hydrodynamic bearing assemblies of the type which provide support and rotation for a high speed spindle element. More specifically, the present invention relates to hydrodynamic bearing assemblies which are utilized in a computer disk drive recording system.

BACKGROUND OF THE INVENTION

The predominant trend in the disk drive industry for the past several years has been to increase track density in order to achieve increased data storage capacity. One of the difficulties which must be overcome in achieving this goal, however, is the ability to maintain tracking position accuracy as the track density increases.

A major source of tracking position inaccuracy in computer disk drive systems is spindle bearing motion—commonly referred to as "runout". Conventional drives utilize ball bearing assemblies which are prone to numerous mechanical problems, such as large runout, wear, complex manufacturing requirements, and so on. In an attempt to overcome these problems and attain higher track densities, many companies in the disk drive industry are focusing their attention on alternative spindle bearing designs.

As an alternative to conventional ball bearing spindle systems, researchers have concentrated much of their efforts on developing a hydrodynamic bearing. In these types of bearings, a lubricating fluid—either air or liquid—functions as the actual bearing surface between a stationary base or housing and the rotating spindle. For, example, liquid lubricants comprising oil or more complex ferromagnetic fluids have been developed for use in hydrodynamic bearing systems.

In the case of a hydrodynamic bearing employing a liquid lubricant, the lubricating fluid itself must be sealed within the bearing. Otherwise, the physical surfaces of the spindle and housing would contact one another leading to increased wear and eventual failure of the bearing system. Most often, these seals are accomplished by developing a pressurized film on the surface of the liquid/air interface. In the case of bearing assemblies which employ ferromagnetic fluids, the seal is achieved by means of a magnetic field established at each end of the bearing. By way of example, a radial bearing assembly which utilizes a ferromagnetic fluid is disclosed in U.S. Pat. No. 4,526,484. Hydrodynamic bearing assemblies in which oil acts as the lubricating fluid are disclosed in U.S. Pat. Nos. 5,067,528 and 4,795,275.

In the past, hydrodynamic bearing assemblies have suffered from numerous disadvantages. For example, bearing assemblies which utilize ferro fluids are known to suffer leakage problems as metallic particles suspended within the ferro-fluid solution are gradually pulled out over time. Obviously, any leakage of the lubricating fluid within the disk drive assembly can cause considerable performance problems.

In other instances, prior hydrodynamic bearing assemblies suffer from the disadvantage of requiring extremely tight clearances and alignments. This burden often makes it difficult to manufacture such assemblies since even a small deviation or aberration in a component's dimension or alignment tolerance can lead to a faulty bearing. As an example, misalignment of the spindle relative to the housing or base during the assemblage of the disk drive can create lateral deflection forces which act upon the bearing. These forces cause uneven pressures to develop, eventually resulting in increased wear of the bearing components.

Other shortcomings include the fact that many prior art hydrodynamic bearing assemblies frequently require large, bulky structural elements for supporting the axial and radial loads. Such assemblies are not generally scaleable to the smaller drive dimensions currently in consumer demand.

As will be seen, the present invention provides an extremely simple and highly scaleable hydrodynamic bearing assembly for use within an information storage unit such as a computer disk drive system. The invention overcomes the shortcomings of the prior art and is characterized by its scaleability, ease of assembly, and support of axial and radial loads with a minimum number of components. The invention is also highly tolerant of deflection forces which are frequently produced as part of the overall manufacturing process.

Other prior art known to Applicant includes a thesis paper by J. P. Reinhoudt entitled, "On the Stability of Rotor-and-Bearing Systems And On The Calculation of Sliding Bearings," dated February 1972.

BRIEF DESCRIPTION OF THE DRAWINGS

The present invention is illustrated by way of example and not limitation in the figures of the accompanying drawings, in which like references indicate similar elements, and in which:

FIG. 1 is a cross-sectional side view of the information storage unit of the present invention.

FIG. 2 is a top view of the storage unit of FIG. 1, as shown with the cover plate removed.

FIG. 3 is an exploded view of the hydrodynamic bearing assembly of the present invention.

FIG. 4 is an exploded view of the assembly of FIG. 3, further illustrating the location of the liquid lubricant.

FIG. 5 is an exploded view of a portion of FIG. 4 which more clearly illustrates the capillary seal for the bearing.

FIG. 6 illustrates an alternative embodiment of the hydrodynamic bearing assembly of the present invention.

SUMMARY OF THE INVENTION

A hydrodynamic bearing assembly for a disk storage unit is disclosed. In one embodiment, the invention comprises a stationary base plate, a cover plate, and a means for securing the cover to the base to form a housing. A spindle or hub having a longitudinal axis is disposed in the cavity formed between the base and cover. The hub supports an annular rigid-disk which provides a recording medium for storage of information thereupon.

In one embodiment, the invention includes a hydrodynamic bearing which permits rotational movement of the hub within the cavity. The bearing comprises a pair of balls disposed within a pair of corresponding sockets. The balls and sockets are aligned along a longitudinal axis on opposite sides of the hub.

Two alternatives for the attachment of the balls and sockets are contemplated: either the pair of sockets or the pair of balls is affixed to the hub, with the other pair being affixed to the base and cover plates, respectively.

The bearing assembly operates such that a clearance space is formed between each socket and its associated ball. This space is filled with a liquid lubricant held in place by means of a surface tension dynamic seal.

The hydrodynamic bearing assembly of the present invention is highly scaleable, making it ideally suited for use in ultra-thin information storage units.

DETAILED DESCRIPTION

A hydrodynamic bearing assembly for use in an ultra-thin disk storage unit is described. In the following description, numerous specific details are set forth such as dimensions, material types, spacings, etc., in order to provide a thorough understanding of the present invention. However, it will be obvious to one skilled in the art that the invention may be practiced without these specific details. In other instances, well-known elements and processing techniques have not been shown in particular detail in order to avoid unnecessarily obscuring the present invention.

FIG. 1 illustrates a cross-sectional side view of an information storage unit 10 incorporating the hydrodynamic bearing assembly of the present invention. Information storage unit 10 includes a top cover plate 12, which is securely attached to a base plate 11 by means of screws disposed about the peripheral areas of the plates. Typically, both base plate 11 and top cover 12 comprise a metal or metal alloy such as aluminum, however, other rigid materials may also be used. When assembled, the two plates 11 and 12 form a central cavity therebetween.

Within the cavity formed by plates 11 and 12 resides a spindle or hub 17. Hub 17 supports an annular rigid-disk 14 about its peripheral surface. Rigid-disk 14 is secured by means of a clamp 15 which preferably comprises a metal ring affixed to the hub so as to seat rigid-disk 14 firmly against the outer extending shelf portion of hub 17. Most often, rigid-disk 14 comprises aluminum or an aluminum alloy, whereas in the currently preferred embodiment, hub 17 comprises SAE660 bronze. Of course, other metals or rigid materials may also be used. As is well-known in the information recording art, rigid-disk 14 commonly comprises a magnetic surface material suitable for storage of information in the form of magnetic transitions. In other instances, disk 14 may comprise magnetooptical or other similar materials useful for long-term information storage.

Notice that in FIG. 1, hub 17 includes a pair of spherical sockets 18 located on opposite sides (i.e., in the top and bottom surfaces) of the hub's body. These sockets are centrally located along a longitudinal axis of the hub. Disposed within each of the spherical sockets 18 is a ball 19. Balls 19 are aligned through the center of hub 17 to form a bearing mechanism within sockets 18, as will be described in more detail below.

Note that the upper ball 19a is shown being affixed to cover plate 12 by means of an adhesive 20, such as epoxy glue. Similarly, the lower ball 19b is affixed by means of an adhesive to base plate 11.

In a current embodiment, balls 19 comprise 440C stainless steel formed to a diameter of approximately 0.05 inches. Balls 19 may comprise other metals, such as tungsten carbide, and be formed to diameters less than 700 microinches. Ceramic materials may also be used. This remarkably small dimension allows the entire information storage unit 10 to occupy a minimum space, currently on the order of 3.3 mm high—which is an unprecedented dimension in the field of magnetic recording systems. The balls themselves are seated within an annular depression zone or hollow formed in both cover plate 12 and base plate 11. These depressions provide a means for insuring proper alignment of the balls to their respective sockets.

Instead of using spherical balls glued to each of the plates, any sort of a knob member having an spherical outer surface which extends into each socket could also be used. For instance, a pair of protruding knob members could be machined into the respective plates. Alternatively, knobby pins could be screwed or otherwise affixed into the plates at the appropriate locations. The only requirement of this aspect of the invention is that the protruding member present a correspondingly spherical surface to the socket. (The same is true of each of the sockets with respect to the bails, or knob members.) Thus, a great variety of configurations are possible.

The actuator arm assembly used for positioning one or more transducers over disk 14 has not been shown in FIG. 1 for reasons of clarity. Nonetheless, implementing such an arm assembly is considered to be well within the skill of the art. Likewise, a motor assembly including a stator, coil windings, permanent magnets, etc., for generating rotational movement of hub 17 relative to base 11, is also not shown since incorporation of these elements into the information storage unit of FIG. 1 is considered well within the skill of the art.

Consider for example, a stator attached to base 11 and disposed within an annular space created within the body of hub 17. Permanent magnets may be attached to this inner annular space such that application of power to the coil windings wrapped about the stator would produce high-speed rotation of hub 17. In another embodiment, a permalloy zone might be formed around the outer radius of disk 14. Electromagnetic windings disposed about this zone could then be used to implement a motor assembly external to the hub. Hence, numerous possibilities exist for incorporating a motor assembly into the storage unit of FIG. 1.

FIG. 2 illustrates a top view of the information storage unit of FIG. 1 with cover plate 12 removed. Note the axial location of socket 18a in relation to hub 17 and disk 14. Concentric about socket 18a is an upper hub surface 26a. Beyond that is located disk clamp 15.

FIG. 3 shows an expanded view of the hydrodynamic bearing assembly included in the present invention. Observe that FIG. 3 illustrates more clearly the position of spherical balls 19 to their respective lower and upper plate members 11 and 12. In the currently preferred embodiment, each of the spherical balls 19 is bonded into an annular depression zone 20 to firmly seat the balls into cover plate 12 and base plate 11. An epoxy adhesive is used to bond each ball to its respective plate member.

An important aspect of the bearing assemblies is the groove pattern 22 which is coined or etched into the surface of each ball 19 or socket 18. FIGS. 3 and 4 show this diagonal groove pattern extending across a wide portion of the upper (or lower) hemisphere of ball 19. Grooves 22 are formed at an angle of approximately 37° and to a depth which is roughly equal to the minimum clearance between the ball and the socket (approximately 50–500 microinches). Although the illustrated pattern comprises a series of rectilinear markings, it is understood that a multitude of different patterns may be utilized without detracting from the operation of the invention.

The purpose of grooves 22 is to develop hydrodynamic pressure within the clearance spaces formed between the balls and sockets. This pressure is developed by means of two converging surfaces: the physical surfaces comprising the outer surface of ball 19 and the inner, moving surface of socket 18. In accordance with well understood principles of physics, the shape of the bearing surface determines the pressure distribution within this gap region. The optimal groove pattern for a particular embodiment, of course, is dependent upon many factors—including the viscosity of the lubricating fluid sealed within the gap, the rotational speed of the hub, the various materials employed and their associated surface finish, as well as the volume of space occupied by the lubricant. Currently, a lubricant comprising a synthetic oil manufactured by William F. Nye Corp. of Bedford, Mass.—known as polyalfaolefin—is used. Ordinary mineral oil could also be used.

The lubricant oil 30 is delivered into the clearance spaces between balls 19 and sockets 18 during manufacturing by means of lubricant fill holes 23. Holes 23 are machined into cover plate 12 and base plate 11 at a location near the edge of each spherical socket 18. This facilitates the administering of the lubricant to the ball-/socket interface by means of a syringe. When the hub is rotated at high speed during operation, lubricating fluid 30 is held within the clearance space or gap by means of the diverging capillary action created between the moving socket and stationary ball. The surface tension forces balance the pressure forces forming a stable meniscus 31. This is shown most clearly in FIG. 5.

To prevent fluid leakage from the clearance spaces, upper and lower surfaces 26 of hub 17 are preferably coated with a barrier film. The barrier film comprises a substance characterized by its lack of affinity for combining with the lubricant. In other words, the barrier film prevents the oil from wetting surfaces 26, so as to confine lubricating fluid 30 within the clearance space formed at the ball/socket interface. In the current embodiment, the barrier film comprises a polymer film known by the chemical name polydihydropentadecafloroctalmethylacrolate. This chemical is sold under the tradename NYEBAR TM, and is also manufactured by the William B. Nye Corp., of Bedford, Mass.

FIG. 6 shows an alternative embodiment of the hydrodynamic bearing assembly which comprises the present invention. In FIG. 6, sockets 18 are shown formed integrally within cover plate 12 and base plate 11. This is opposite to the previous embodiment wherein the sockets were formed with the hub. Furthermore, in the embodiment of FIG. 6, balls 19 are attached to the top and bottom sides of hub 17. Hub 17 includes a pair of oppositely opposed annular depression zones 39 for seating balls 19 in alignment along a longitudinal axis of the hub. As before, balls 19 are bonded to hub 17 by means of an epoxy adhesive.

The main difference, of course, between the embodiment of FIG. 6 and the previous embodiment is that balls 19 rotate with hub 17 while the sockets 18 (disposed in plates 11 and 12) remain stationary. Note that the embodiment of FIG. 6 also includes grooves 22 formed into the outer surface of balls 19. Alternatively, the groove may be formed into the spherical surface of sockets 18. It is appreciated that in any of the described embodiments, grooves 22 can be located either on the outer surface of balls 19, or on the inner surface of spherical sockets 18.

One of the advantages of the bearing assembly of FIG. 6 is that as the metal surfaces of balls 19 spin, the centrifugal force generated in the lubricating fluid is such that the lowest energy state of the fluid is where the fluid is disposed well within the clearance space between the ball and socket. In other words, the centrifugal force experienced by the fluid will tend to maintain the fluid away from the area near the attachment point of the ball to the hub. Consequently, there is much less chance that the lubricating fluid will be lost from the clearance spaces over the lifetime of the drive. Because the chance of fluid loss is in the assembly of FIG. 6, this design functions well without the need for a barrier film.

As was the case for the earlier embodiments, fill holes may be utilized to administer spaces between balls 19 and sockets 18.

I claim:

1. A hydrodynamic bearing assembly for a rigid-disk recording unit comprising:
   a base;
   a cover secured to said base, creating a cavity therebetween;
   a hub disposed within said cavity supporting an annular rigid-disk, said rigid-disk providing a recording medium for storage of information thereon;
   bearing means for permitting rotational movement of said hub within said cavity along a longitudinal axis, said bearing means comprising a pair of balls disposed within a pair of sockets aligned with said longitudinal axis on opposite sides of said hub, said sockets having a spherical section for receiving a hemisphere of said balls and a cylindrical section extending beyond said hemisphere, either of said pair of sockets or said pair of balls being affixed to said hub, with the other of said pair being respectively affixed to said base and said cover;
   said assembly further comprising a space disposed between each socket and its associated ball, said space being filled with a liquid lubricant such that a meniscus is formed between each of said balls and said cylindrical section of each of said sockets.

2. The assembly of claim 1 wherein said sockets are integral with said base and said cover, and said balls are bonded to said hub.

3. The assembly of claim 1 wherein said sockets are integral with said hub and said balls are bonded to said base and said cover.

4. The assembly of either claim 2 or 3 wherein either said balls or said sockets comprise grooves for generating pressure within said spaces.

5. The assembly of claim 4 wherein said balls are bonded with an epoxy adhesive.

6. The assembly of claim 4 wherein said liquid lubricant comprises oil.

7. The assembly of claim 6 wherein said balls comprise stainless steel.

8. The assembly of claim 4 further comprising a means for filling said spaces with said lubricant.

9. The assembly of claim 1 wherein said unit is less than 10 millimeters thick.

10. A hydrodynamic bearing assembly for a disk storage unit comprising:
    a base plate;
    a cover plate secured to said base plate;
    a hub having a pair of sockets disposed at opposite ends of said hub along a longitudinal axis, each of said sockets having a spherical section and a cylindrical section;

first and second spherical knob members attached to said base and cover plates, respectively, said knob members being disposed within said spherical section of said sockets along said longitudinal axis, clearance spaces being formed between each socket and its associated spherical knob member, said clearance spaces being filled with a liquid lubricant facilitating rotational movement of said hub about said longitudinal axis, said lubricant forming a stable meniscus between each of said knob members and said cylindrical section of each of said sockets.

11. The bearing assembly of claim 10 further comprising a means for generating hydrodynamic pressure within each of said clearance spaces.

12. The assembly of claim 11 wherein said pressure generating means comprises a plurality of grooves formed either on said spherical knob members, or within said sockets, said grooves providing converging surfaces for generating said pressure.

13. The assembly of claim 10 wherein said liquid lubricant comprises oil.

14. The bearing assembly of claim 13 wherein said spherical knob members comprise metal balls adhesively bonded to said base and cover plates.

15. The bearing assembly of claim 14 wherein said hub supports an annular rigid-disk having a surface suitable for storage of information thereon.

16. The assembly of claim 15 wherein said balls comprise stainless steep.

17. The assembly of claim 16 wherein said hub comprises bronze.

18. The assembly of claim 15 wherein said balls comprise tungstun carbide.

19. The bearing assembly of claim 10 further comprising a means for filling said clearance spaces with said lubricant.

20. A hydrodynamic bearing assembly for a disk storage unit comprising:

a base;

a cover, said base and said cover each having a pair of sockets disposed therein on opposing surfaces, each of said sockets having a spherical section and a cylindrical section, said cover being secured to said base such that said sockets are aligned along a longitudinal axis;

a hub having top and bottom radially extending surfaces, said hub having first and second spherical knob members protruding out from said top and bottom surfaces, respectively, each of said spherical knob members being disposed within said spherical section of said sockets along said longitudinal axis with said cylindrical section extending beyond a hemisphere of its associated spherical knob member:

a space formed between each of said spherical knob members, said space being filled with a lubricant fluid which facilitates rotational movement of said hub about said longitudinal axis.

21. The bearing assembly of claim 20 wherein said spherical knob members comprise first and second metal balls adhesively bonded to said hub.

22. The bearing assembly of claim 21 wherein said hub supports an annular rigid-disk having a surface suitable for storage of information thereon.

23. The bearing assembly of claim 22 wherein said lubricant fluid comprises oil.

24. The bearing assembly of claim 20 further comprising a means for filling said spaces with said oil.

25. The bearing assembly of claim 24 wherein said balls comprising stainless steel.

26. The bearing assembly of claim 25 wherein said hub comprises bronze.

27. The bearing assembly of claim 20 wherein said balls are less than 700 microinches in diameter.

28. The bearing assembly of claim 20 wherein said unit is less than 10 millimeters thick.

29. An information storage unit comprising:

a stationary base;

a cover; secured to said base, creating a cavity therebetween;

a hub disposed within said cavity for supporting an annular rigid-disk, said rigid-disk providing a recording medium for storage of information thereon;

hydrodynamic bearing means for rotational movement of said hub within said cavity along a longitudinal axis, said bearing means comprising a pair of balls disposed within a pair of sockets aligned with said longitudinal axis on opposite sides of said hub, said sockets having a spherical section for receiving a hemisphere of said balls and a cylindrical section extending beyond said hemisphere, either said pair of sockets or said pair of balls being affixed to said hub, with the other of said pair being respectively affixed to said base and said cover;

wherein a gap is formed between each socket and its associated ball, said gap being filled with a liquid lubricant such that a meniscus is formed between each of said balls and said cylindrical section of each of said sockets to facilitate rotational movement of said hub about said longitudinal axis.

30. The storage unit of claim 29 wherein said sockets are integral with said base and said cover, and said balls are bonded to said hub.

31. The storage unit of claim 29 wherein said sockets are integral with said hub and said balls are bonded to said base and said cover.

32. The storage unit of claim 29 further comprising a means for generating pressure within said gaps.

33. The storage unit of claim 32 further comprising a means for securing said rigid-disk to said hub.

34. The storage unit of claim 29 wherein said unit is less than 10 millimeters thick.

* * * * *